Sept. 27, 1955
A. GREENFIELD
2,719,285
TELEMETERING SYSTEM
Filed May 31, 1951
3 Sheets-Sheet 1
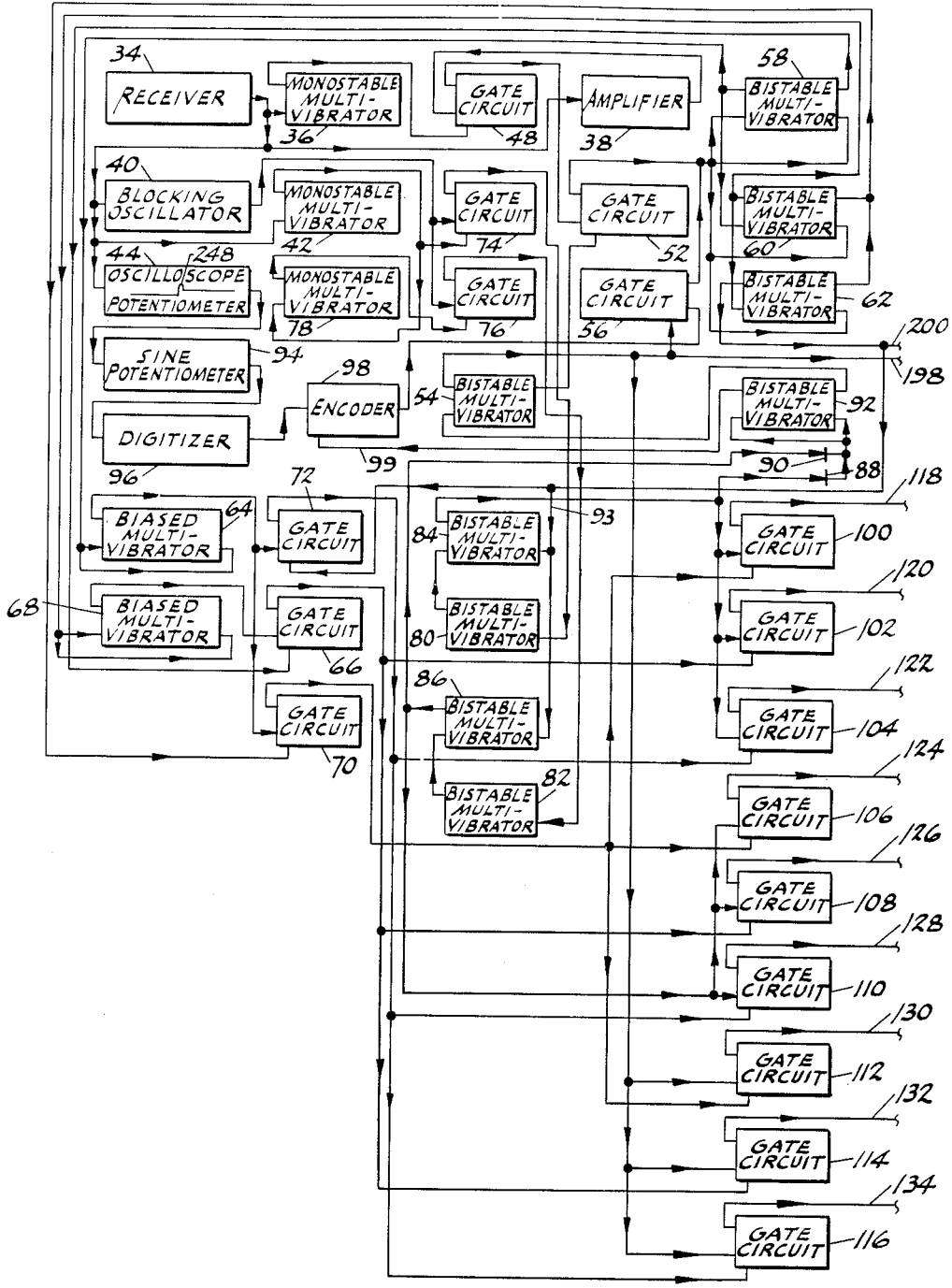
FIG. 1-A
INVENTOR.
ALEXANDER GREENFIELD
BY
Edensworth R. Roston
ATTORNEY

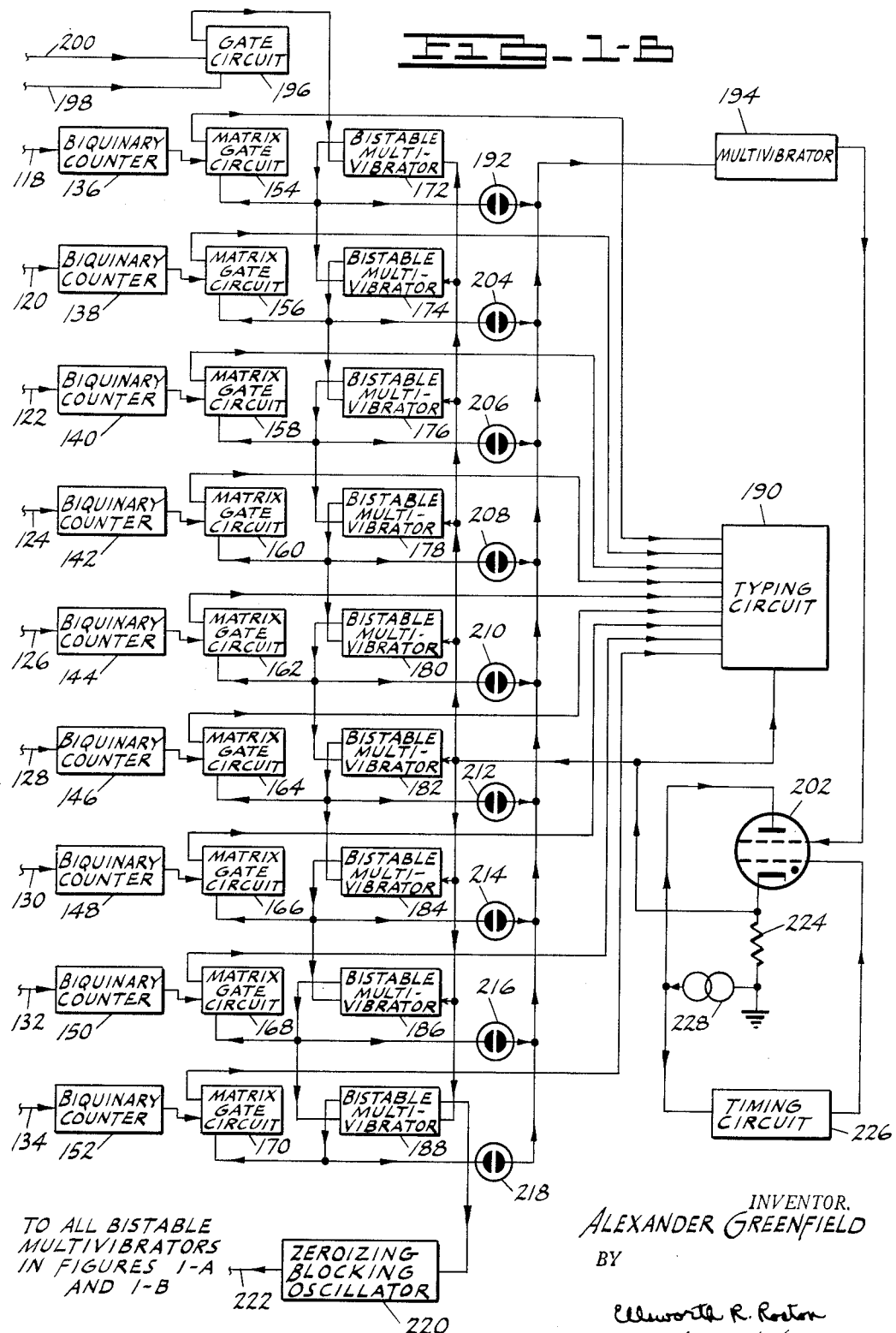

Sept. 27, 1955  A. GREENFIELD  2,719,285
TELEMETERING SYSTEM
Filed May 31, 1951  3 Sheets-Sheet 3
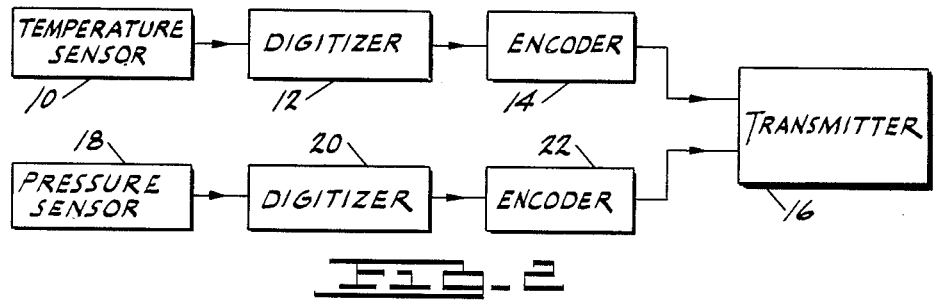
FIG-2
FIG-3
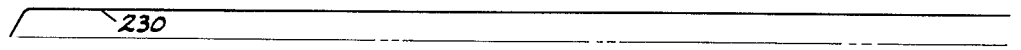
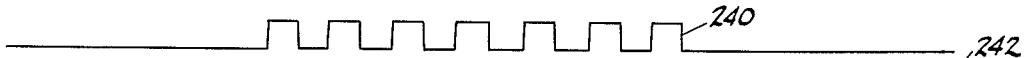
FIG-4
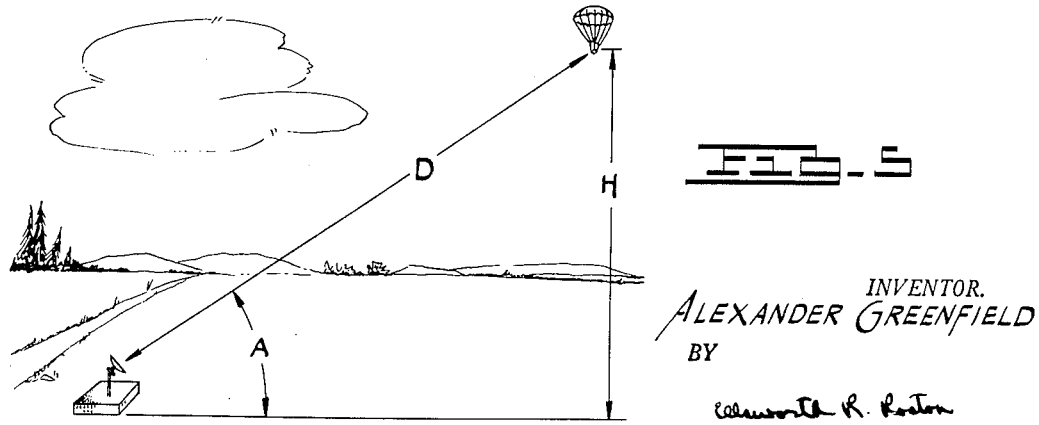
FIG-5
INVENTOR.
ALEXANDER GREENFIELD
BY
ATTORNEY United States Patent Office 2,719,285
Patented Sept. 27, 1955

2,719,285

TELEMETERING SYSTEM

Alexander Greenfield, Detroit, Mich., assignor to Bendix Aviation Corporation, Detroit, Mich., a corporation of Delaware Application May 31, 1951, Serial No. 229,226

22 Claims. (Cl. 340—183)

This invention relates to an electrical system for decoding and printing information representing a plurality of measurements and more particularly to an electrical system for operating in a positive manner on a plurality of sequential signals to convert them into printed information representing a plurality of measurements.

In co-pending application Serial No. 183,717, filed September 8, 1950, by Charles A. Piper, an air-borne electrical system has been disclosed for measuring a plurality of conditions, such as temperature and pressure, between altitudes of 0 to 100,000 feet. The measurements are made to provide meteorological information for the determination of future weather conditions. Each of the measurements is converted into a plurality of signals spaced from one another in accordance with the values of the different digits in the measurement. The signals representing each measurement are transmitted to a ground station to be decoded, recorded and analyzed.

This invention provides an electrical system which is incorporated in the ground station to decode and record the signals transmitted from the air-borne apparatus. The system operates in a positive manner to convert the spacing between each pair of adjacent signals into a form which provides a quick and easy indication of the value of the digit represented by the spacing. The system also operates on the signals to provide a correlating determination of the altitude at which the various measurements are made.

An object of this invention is to provide an electrical system for decoding a plurality of sequentially transmitted signals and for recording the numerical information represented by the signals.

Another object of the invention is to provide an electrical system of the above character for converting the time spacings between a plurality of sequentially transmitted signals into numerical indications proportional to the time spacings.

A further object is to provide an electrical system of the above character for operating in a positive manner to record sequentially information relating to a plurality of different conditions.

Still another object is to provide an electrical system of the above character for operating on the sequentially transmitted signals to provide a determination of a condition, such as altitude, correlating the other conditions.

A still further object is to provide an electrical system of the above character which is accurate, efficient and reliable.

Other objects and advantages will be apparent from a detailed description of the invention and from the appended drawings and claims.

In the drawings:

Figures 1A and 1B are circuit diagrams, essentially in block form, which together constitute an electrical system at a ground station for decoding the signals transmitted to it and for providing a permanent record of the information furnished by such signals;

Figure 2 is a circuit diagram, essentially in block form, of an air-borne electrical system for measuring a plurality of different conditions and for converting the measurements into a convenient form for transmission to the ground station system shown in Figures 1A and 1B;

Figure 3 illustrates a typical time relationship between the different signals which are sequentially transmitted by the system shown in Figure 2;

Figure 4 shows curves illustrating wave forms at strategic points in the system shown in Figures 1A and 1B; and Figure 5 illustrates how a determination of the altitude of the air-borne system shown in Figure 2 is made at the ground station.

The system shown in Figure 2 is used in conjunction with one embodiment of the invention and is disclosed in detail in co-pending application Serial No. 183,717, filed September 8, 1950, by Charles A. Piper. The system is housed in the nose of a rocket, which is carried to a height of approximately 100,000 feet above the ground after launching, the nose of the rocket then becoming detached from the rocket body and floating relatively slowly to the ground by parachute. The system includes a temperature sensor 10, digitizer 12 and encoder 14 connected in cascade arrangement, with the outputs from the encoder 14 in turn being introduced to a transmitter 16. Similarly, a pressure sensor 18, a digitizer 20 and an encoder 22 are connected in cascade arrangement to the transmitter 16.

As the rocket head floats by parachute to the ground, the temperature sensor 10 measures the temperature of the atmosphere surrounding the equipment. Each measurement is converted by the digitizer 12 into a plurality of voltages proportional to the value of each digit in the measurement. For example, with a temperature measurement of 368° K., three voltages of 3, 6 and 8 volts are respectively produced by the digitizer 12. Similarly, three voltages of 2, 7 and 9 volts are produced by the digitizer 12 when the temperature measurement is 279° K.

Upon the reception of alternate interrogation pulses from the ground station, as will be disclosed in detail hereafter, the voltages produced by the digitizer 12 are converted by the encoder 14 into a sequence of pulses separated from one another by periods of time proportional to the voltages. For example, with an interval of 30 microseconds representing an integer and with an initial interval of 30 microseconds representing the integer "0," four pulses are produced which are respectively spaced by periods of 120, 210 and 270 microseconds when the temperature is 368° K. Similarly, four pulses separated by periods of 90, 240 and 300 microseconds are produced when the temperature measurement is 279° K. The four pulses are in each case preceded by a pulse separated from the other pulses by a predetermined period of time, such as 20 microseconds. The period of 20 microseconds indicates that the four pulses which follow represent temperature, rather than pressure, information. The five pulses in each sequence are respectively indicated at 24, 26, 28, 30 and 32 in Figure 3. These pulses are sent out by the transmitter 16 to the embodiment of the invention shown in Figures 1A and 1B.

In like manner, the pressure of the atmosphere surrounding the air-borne equipment is measured by the pressure sensor 18 and converted by the digitizer 20 into a plurality of voltages proportional to the values of the different digits constituting the measurement. Upon the reception of alternate interrogation pulses, the voltages from the digitizer 20 are converted by the encoder 22, in a manner similar to that disclosed above, into a plurality of pulses spaced from one another by periods of time proportional to the voltages. These pulses are preceded by a period of time, such as 12 microseconds, to indicate that the pulses which follow represent pressure information.

The system shown in Figures 1A and 1B decodes the signals transmitted by the system shown in Figure 2 and records the information for subsequent analysis. The system includes a receiver 34 connected to the grid of the left tube in a monostable multivibrator 36, as well as to an amplifier 38, a blocking oscillator 40, the grid of the left tube in a monostable multivibrator 42 and a potentiometer 44 in an oscilloscope (not shown). The plate of the left tube in the multivibrator 36 is connected to the control grid of a pentode in a gate circuit 48. The suppressor grid of the pentode in the gate circuit 48 is connected to the output side of the amplifier 38 and the plate of the pentode is connected to the suppressor grid of the pentode in a gate circuit 52.

The control grid of the pentode in the gate circuit 52 is connected to the plate of the right tube in a bistable multivibrator 54. The plate of the pentode in the gate circuit 52 is connected to the plate of the pentode in a gate circuit 56, as well as to the grids of the left and right tubes in a bistable multivibrator 58, the grid of the right tube in a bistable multivibrator 60 and the grid of the right tube in a bistable multivibrator 62.

The plate of the left tube in the bistable multivibrator 58 is connected to the grid of the left tube in the multivibrator 60 and to the grids of the two tubes in a biased multivibrator 64. The plate of the right tube in the multivibrator 58 is connected to the control grid of the pentode in a gate circuit 66. The plate of the left tube in the bistable multivibrator 60 is connected to the grid of the left tube in the bistable multivibrator 62 and to the grids of the two tubes in a biased multivibrator 68. The plate of the right tube in the multivibrator 60 is connected to the control grid of the pentode in a gate circuit 70. The plates of the left and right tubes in the bistable multivibrator 62 are connected to the control grid of the pentode in a gate circuit 72 (Figure 1A) and to the control grid of the pentode in the gate circuit 70, respectively.

As previously disclosed, the output from the receiver 34 is introduced to the input side of the blocking oscillator 40 and to the grid of the left tube in the monostable multivibrator 42. The output side of the oscillator 40 is connected to the suppressor grids of the pentodes in gate circuits 74 and 76. The output from the left tube in the multivibrator 42 is introduced to the control grid of the pentode in the gate circuit 74 and to the grid of the left tube in a monostable multivibrator 78. The control grid of the pentode in the gate circuit 76 and the plate of the left tube in the multivibrator 78 are connected together.

The outputs from the gate circuits 74 and 76 are introduced to the grids of the right tubes in bistable multivibrators 80 and 82, respectively. The plates of the left tubes in the multivibrators 80 and 82 are connected to the grids of the left tubes in bistable multivibrators 84 and 86, respectively. The plates of the left tubes in the multivibrators 84 and 86 are in turn connected to the positive terminals of crystal diodes 88 and 90, respectively, the negative terminals of which are connected to the grids of the two tubes in a bistable multivibrator 92. The grids of the right tubes in the multivibrators 84 and 86 are connected by a lead 93 to the plate of the left tube in the multivibrator 62.

As previously disclosed, signals from the receiver 34 are also introduced to the oscilloscope potentiometer 44, which is connected in cascade arrangement with a sine potentiometer 94, a digitizer 96 and an encoder 98. An input terminal in the encoder 98 is connected by a lead 99 to the plate of the left tube in the bistable multivibrator 92. The output from the encoder 98 is introduced to the suppressor grid of the pentode in the gate circuit 56. The plate of the pentode in the gate circuit 56 is connected to the grids of both tubes in the bistable multivibrator 58 and to the grids of the right tubes in the multivibrators 60 and 62, and the control grid of the pentode is connected to the plate of the left tube in the bistable multivibrator 54. The grid of the left tube in the multivibrator 54 is in turn connected to the plate of the right tube in the multivibrator 92.

The plates of the pentodes in the gate circuits 72, 66 and 70 are connected to the control grids of the pentodes in gate circuits 100, 106 and 112; gate circuits 102, 108 and 114; and gate circuits 104, 110 and 116, respectively. The suppressor grids of the pentodes in the gate circuits 100, 102 and 104, the gate circuits 106, 108 and 110 and the gate circuits 112, 114 and 116, are connected to the plates of the left tubes in the multivibrators 84, 86 and 54, respectively.

The plates of the pentodes in the gate circuits 100 to 116 (Figure 1A), inclusive, are respectively connected through leads 118 to 134 (Figures 1A and 1B), inclusive, to the input sides of biquinary counters 136 to 152 (Figure 1B), inclusive, the output sides of which are respectively connected to the suppressor grids of the pentodes in matrix gate circuits 154 to 170, inclusive. The control grids of the pentodes in the matrix gate circuits 154 to 170, inclusive, are respectively connected to the plates of the left tubes in bistable multivibrators 172 to 188, inclusive. The output signals from the plates of the pentodes in the gate circuits 154 to 170, inclusive, are introduced to input terminals in a typing circuit 190, as will be disclosed in detail hereinafter.

In addition to being connected to the control grid of the pentode in the gate circuit 154, the plate of the left tube in the bistable multivibrator 172 is connected to the grid of the left tube in the multivibrator 174 and to one electrode of a neon bulb 192, the other electrode of which is connected to the grid of the left tube in a multivibrator 194. The grid of the left tube in the multivibrator 172 is connected to the plate of the pentode in a gate circuit 196 (Figure 1B), the control and suppressor grids of which are respectively connected through leads 198 and 200 (Figures 1A and 1B) to the plate of the left tube in the multivibrator 54 (Figure 1A) and the plate of the left tube in the multivibrator 62, respectively. The grid of the right tube in the multivibrator 172 (Figure 1B) is connected to the cathode of a gas-filled tube 202.

Similarly, the plates of the left tubes in the multivibrators 174 to 186, inclusive, are respectively connected to the grids of the left tubes in the multivibrators 176 to 188, inclusive. The plates of the left tubes in the multivibrators 174 to 188, inclusive, are also respectively connected to one electrode of neon bulbs 204 to 218, inclusive, the other electrode of which is connected to the grid of the left tube in the multivibrator 194. The grids of the right tubes in the multivibrators 174 to 188, inclusive, are connected to the cathode of the gas-filled tube 202. The plate of the right tube in the multivibrator 188 is connected to the input side of a blocking oscillator 220, the output side of which is connected by leads similar to the lead 222 to the grid of the normally non-conductive tubes in all of the bistable multivibrators previously disclosed, that is, the output side of the blocking oscillator 220 is connected to the grids of the right tubes in the bistable multivibrators 54, 84, 86, 58, 60, 62 and 92 in Figure 1-A, to the grids of the left tubes in the bistable multivibrators 80 and 82 in Figure 1-A and is also connected to the grids of the right tubes in the bistable multivibrators 172, 174, 176, 178, 180, 182, 184, 186 and 188 in Figure 1-B.

The cathode of the gas-filled tube 202 is connected to an input terminal of the typing circuit 190 and to a grounded resistance 224 as well as to the grids of the right tubes in the bistable multivibrators 172 to 188, inclusive. The control grid of the tube 202 is connected to the output side of a timing circuit 226, the input side of which is connected to the ungrounded side of an alternating power source 228. The plate of the tube 202 is connected to the ungrounded side of the power source 228, and the shield grid is connected to the plate of the right tube in the multivibrator 194.

The signals transmitted to the ground station equipment shown in Figures 1A and 1B are introduced through the receiver 34 to the multivibrator 36 and the amplifier 38. Upon the introduction of the first pulse 24 (Figure 3) in each pulse sequence, the normally conductive left tube of the multivibrator 36 is cut off to produce at its plate a positive pulse, indicated at 230 in Figure 4, which continues until after the reception of the last pulse 32 in the sequence. Because of the time delay provided in the multivibrator, the positive pulse 230 does not attain a maximum amplitude until a few microseconds after the introduction of the acknowledging pulse 24.

The voltages on the grids of the pentode in the gate circuit 48 are adjusted so that signals pass through the gate circuit only during the time that the pulse 230 from the multivibrator 36 has a maximum amplitude. Thus, because of the time delay in the pulse 230, the gate circuit 48 does not pass the pulse 24 but does pass the pulses 26, 28, 30 and 32, the pulses having been introduced to the gate circuit 48 through the amplifier 38. Pulses 26, 28, 30 and 32 then pass in sequence through the gate circuit 52 to the multivibrators 58, 60 and 62. The gate circuit 52 is open during the reception of all of the pulses in each measurement because of a positive pulse on the control grid of its pentode from the plate of the right tube in the multivibrator 54, as will be explained in detail hereinafter.

The left tubes of the multivibrators 58, 60 and 62 are normally conducting. Upon the introduction of the pulse 26 in each sequence to the multivibrator 58, the left tube in the multivibrator becomes cut off and a positive pulse is produced on its plate. The cut-off of the left tube in the multivibrator 58 causes the right tube in the multivibrator to start conducting and a negative pulse to be produced on its plate. When the pulse 28 is introduced through the gate circuits 48 and 52 to the grids of the two tubes in the multivibrator 58, the right tube in the multivibrator becomes cut off and the left tube conducts. The resultant negative pulse on the plate of the left tube in the multivibrator 58 causes the left tube in the multivibrator 60 to become cut off and the right tube to conduct.

The right tube in the multivibrator 60 conducts until the introduction of the pulse 30 to its grid, at which time the right tube becomes cut off and the left tube once again conducts to produce a negative pulse on its plate. Since the plate of the left tube in the multivibrator 60 is connected to the grid of the left tube in the multivibrator 62, the left tube in the multivibrator 62 becomes cut off upon the introduction of the pulse 30 and remains cut off until the introduction of the pulse 32 to the grid of the right tube in the multivibrator. The pulses on the plates of the left tubes in the multivibrators 58, 60 and 62 are indicated at 232, 234 and 236, respectively. As may be seen, a positive pulse is produced on the plate of the left tube in the multivibrator 58 during the period between the pulses 30 and 32 as well as during the period between the pulses 26 and 28, since each tube in the multivibrator is alternately cut off upon the introduction of successive pulses.

The left tubes in the biased multivibrators 64 and 68 are normally conducting. When a positive signal is introduced to the grids of the two tubes in each multivibrator, the multivibrator becomes "free-running" and the two tubes in the multivibrator alternately conduct for short periods of time to produce oscillatory signals on their plates. Thus, positive oscillatory signals are produced on the plate of the left tube in the multivibrator 64 during the period between the pulses 26 and 28 and during the period between the pulses 30 and 32 because of the introduction of the positive pulses 232 from the multivibrator 58. Similarly, positive oscillatory signals are produced on the plate of the left tube in the multivibrator 68 during the period between the pulses 28 and 30 because of the introduction of the positive pulse 234 from the multivibrator 60. The positive signals are produced at predetermined intervals, such as 30 microseconds, corresponding to the spacing representing an integer in the pulses transmitted by the system shown in Figure 2.

Since the positive pulses on the plates of the right tubes in the multivibrators 60 and 62 coincide only during the period between the pulses 26 and 28, the gate circuit 70 is open only during this period for the passage of the oscillatory signals from the multivibrator 64, as indicated at 238 in Figure 4. As indicated at 240, the gate circuit 66 passes oscillatory signals only during the period between the pulses 28 and 30 in each measurement because of the coincidence of the positive pulse from the right tube in the multivibrator 58 and the positive oscillatory signals from the multivibrator 68. Similarly, positive oscillatory signals, indicated at 242, pass through the gate circuit 72 during the period between the pulses 30 and 32 as a result of coincidence between the positive pulse from the plate of the left tube in the bistable multivibrator 62 and the positive oscillatory signals from the plate of the left tube in the multivibrator 64. Thus, the gate circuits 70, 66 and 72 sequentially pass oscillatory signals for periods representing the first, second and third digits, respectively, of each pressure and temperature measurement. The operation of the bistable multivibrators 58, 60 and 62, the biased multivibrators 64 and 68 and the gate circuits 70, 66 and 72 is described in detail in co-pending application Serial No. 193,735, filed November 2, 1950 by Alexander Greenfield.

The monostable multivibrators 42 and 78 and the gate circuits 74 and 76 operate to alternately pass through the gate circuits 70, 66 and 72 the signals representing the temperature and pressure measurements. The normally conductive left tube in the multivibrator 42 becomes cut off, upon the reception of the first pulse 24 in each sequence, to produce on its plate a positive pulse which lasts for a predetermined period of time, such as 15 microseconds. The multivibrator parameters are chosen so that the multivibrator responds with a slight lag for a reason which will be explained in detail hereafter. At the end of the 15 microsecond period, the left tube in the multivibrator 42 starts to conduct again and the resultant negative pulse on its plate causes the left tube in the multivibrator 78 to become cut off and a positive pulse to be produced on its plate. The pulse on the plate of the left tube in the multivibrator 78 continues for a predetermined period of time, such as 10 microseconds.

When a positive pulse from the left tube in the multivibrator 42 is introduced to the control grid of the pentode in the gate circuit 74, the gate circuit passes the signals introduced to the suppressor grid of its pentode through the blocking oscillator 40, which serves to sharpen the signals from the receiver 34 and invert their polarity. Since the 15 microsecond pulse produced by the multivibrator 42 overlaps the time interval of 12 microseconds which represents the separation between the pulses 24 and 26 in the pressure measurement, the gate circuit 74 passes only the pulse 26 in the pressure measurement. Only the pulse 26, and not the pulse 24, in each pressure sequence passes through the circuit 74 because of the slight lag in response by the multivibrator 42. Similarly, the gate circuit 76 passes only the pulse 26 in the temperature measurement because of the coincidence between the pulse from the multivibrator 78 and the pulse 26 in the temperature measurement.

After passing through the gate circuit 74, the pulse 26 in each pressure sequence cuts off the right tube in the multivibrator 80 and causes the left tube in the multivibrator to conduct. The resultant negative pulse on the plate of the left tube in the multivibrator 80 causes the left tube in the multivibrator 84 to become cut off and a positive pulse to be produced on the plate of the left tube. The positive pulse from the left tube in the multivibrator 84 is introduced to the suppressor grids of the pentodes in the gate circuits 100, 102 and 104 so that the pressure information from the gate circuits 70, 66 and 72 may pass sequentially through the gate circuits 100, 102 and 104, respectively. In like manner, after passing through the gate circuit 76, the pulse 26 in each temperature sequence triggers the multivibrator 82, which in turn triggers the multivibrator 86 to produce a positive pulse on the plate of the left tube in the multivibrator. This positive pulse opens the gate circuits 106, 108 and 110 for the sequential passage of temperature information from the gate circuits 70, 66 and 72, respectively. Each of the gate circuits 100, 102 and 104 and the gate circuits 106, 108 and 110 passes a number of signals dependent upon the value of a particular digit in a measurement. These signals are counted and stored in a biquinary counter associated with each of the gate circuits, such as the counters 136 to 146 (Figure 1B), inclusive.

As previously disclosed, the left tube in the multivibrator 62 is cut off during the period between the pulses 30 and 32 in each sequence. When the left tube in the multivibrator 62 starts to conduct upon the reception of the pulse 32 in each pressure sequence, the resultant negative pulse from the left multivibrator tube causes the right tube in the multivibrator 84 to become cut off, since the two tubes are connected by the lead 93. The left tube in the multivibrator 84 then starts to conduct and produces a negative pulse on its plate. This negative pulse passes through the crystal diode 88 and cuts off the right tube in the multivibrator 92. The left tube in the multivibrator 92 then conducts until the reception of the last pulse in the temperature sequence, which acts through the multivibrators 62 and 86, in a manner similar to that disclosed above, to cut off the left tube in the multivibrator 92. When the left tube in the multivibrator 92 becomes cut off, the positive pulse on its plate activates the encoder 98 so that the encoder produces a sequence of pulses spaced from one another in accordance with the values of successive digits in the altitude measurement, which is obtained in a manner fully disclosed hereafter. At the same time, the right tube in the multivibrator 92 starts to conduct and causes a negative pulse to be introduced to the grid of the left tube in the multivibrator 54. The resultant positive pulse on the plate of the left tube in the multivibrator 54 prepares the gate circuit 56 for the passage of signals from the encoder 98 representing altitude. The negative pulse on the plate of the right tube in the multivibrator 54 closes the gate circuit 52 to the further passage of the signals representing pressure and temperature.

The altitude of the air-borne apparatus can be determined from the distance, illustrated at D in Figure 5, between the ground station and the air-borne apparatus. This distance is proportional to the time between the transmission of each interrogation pulse from the ground station and the reception at the ground station of the first pulse 24 in each sequence transmitted by the air-borne apparatus shown in Figure 2. To provide an indication of distance, the pulse 24 is introduced to the potentiometer 44, which is adjusted so that the pulse appears on the leading edge of the pedestal 248 (Figure 1A) in an oscilloscope (not shown). Since the antenna in the ground station is operated either manually or automatically to point continuously at the air-borne apparatus, the angle which the air-borne apparatus and the ground station form with the ground may be determined. This angle is illustrated at A in Figure 5. By combining the sine of the angle A with the voltage from the potentiometer 44, representing the distance D, the sine potentiometer 94 provides an output voltage which is proportional to the height H of the air-borne apparatus above the ground. The voltage from the sine potentiometer 94 is operated upon by the digitizer 96, which is similar to the digitizers 12 and 20 in Figure 2, to produce a plurality of voltages proportional to the value of each of the digits in the altitude measurement. These voltages are converted by the encoder 98 into a plurality of pulses spaced from one another by time intervals proportional to the voltages and the pulses are introduced to the suppressor grid of the pentode in the gate circuit 56. The pulses are paired by the multivibrators 58, 60 and 62 after passing through the gate circuit 56, and the time intervals between successive pairs of pulses are converted into oscillatory signals which are channelized by the gate circuits 70, 66 and 72 into the gate circuits 112, 114 and 116, respectively. Only the gate circuits 112, 114 and 116 are activated during the passage of the altitude information since a positive pulse is introduced to the suppressor grids of their pentodes from the plate of the left tube in the multivibrator 54. The signals passing through the gate circuits 112, 114 and 116 are then counted by the counters 148, 150 and 152, respectively.

The positive pulse produced on the plate of the left tube in the multivibrator 54 upon the reception of the last pulse in the temperature sequence continues during the decoding and channelization of the signals representing altitude. Thus, this pulse coincides in time with the pulse produced on the plate of the left tube in the multivibrator 62 when the last information pulse in the altitude measurement passes through the gate circuit 56. The pulses from the plates of the left tubes in the multivibrators 54 and 62 are introduced through the leads 198 and 200 (Figures 1A and 1B) to the two grids of the pentode in the gate circuit 196. The coincidence between the two pulses causes the pentode in the gate circuit 196 to conduct and a negative signal to be produced on the grid of the left tube in the bistable multivibrator 172. The positive pulse produced by the resultant cut-off of the left tube in the multivibrator 172 opens the matrix gate circuit 154 to the passage of signals from the counter 136. A combination of signals dependent upon the value of the digit scored in the counter 136 passes from the counter through the gate circuit 154 to the typing circuit 190. Different combinations of signals to indicate the values of different integers between "0" and "9" are conventional in biquinary counters such as the counter 136.

In addition to opening the gate circuit 154, the positive pulse on the plate of the left tube in the multivibrator 172 produces a breakdown of the neon bulb 192, so that the left tube in the multivibrator 194 conducts. A positive pulse is then produced on the plate of the right tube in the multivibrator 194 and is introduced to the shield grid of the gas-filled tube 202. At substantially the same time, the control grid of the tube 202 becomes positive, since an alternating voltage having a predetermined number of cycles per second, such as 7.5 cycles per second, is applied to the grid through the timing circuit 226. Current flows through the tube 202 when a positive voltage appears on the control grid of the tube, since the alternative voltage of 7.5 cycles per second on the grid is synchronized with the alternating voltage, such as 60 cycles per second, on the plate. The current through the tube produces a positive voltage across the resistance 284. This voltage prepares the typing circuit 190 to receive the combination of signals passing through the gate circuit 154 from the counter 136 and a particular key indicative of the signal combination to be operated.

After the numerical information in the counter 136 has been typed, the plate of the tube 202 becomes negative upon the application of the negative portion of an alternating voltage cycle on the plate, and the tube 202 stops conducting. The resultant decrease in voltage at the cathode of the tube 202 cuts off the right tube in the multivibrator 172 and causes current to flow through the left tube in the multivibrator, so that a negative pulse is produced on its plate. This negative pulse cuts off the left tube in the multivibrator 174. The positive pulse produced on the plate of the left tube in the multivibrator 174 then produces a conduction through the left tube in the multivibrator 194, which has previously returned by its own action to a normal condition of conduction through its right tube. The resultant positive pulse on the plate of the right tube in the multivibrator causes the gas-filled tube 202 to be triggered and the typing circuit 190 to be prepared for the introduction of the numerical information stored in the counter 138. In like manner, the information stored in the counters 140 to 152, inclusive, passes sequentially into the typing circuit 190 where the information is recorded for subsequent correlation and analysis.

There is provided a system for decoding and recording information relating to a number of different variable quantities, such as temperature and pressure. The system operates upon a plurality of sequentially transmitted pulses representing each variable quantity to convert the spacing between successive pulses in the sequence into a form which provides a quick and easy indication of the information represented by the spacing. In addition to decoding the transmitted pulses and recording the information represented by the pulses, the system also operates on the transmitted pulses to derive information relating to other conditions.

For example, if the transmitted information relates to the temperature and pressure of the atmosphere at different altitudes, a measurement derived from the transmitted information may relate to the altitude at which the temperature and pressure measurements are made. Other derived measurements may relate to wind direction and wind velocity. The system converts the information relating to each derived condition into a sequence of pulses similar to the transmitted sequences of pulses and then converts these pulse sequences into a recordable form similar to that in which the transmitted pulses are converted.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination with apparatus for measuring a plurality of conditions and for converting each measurement into a plurality of pulses spaced in accordance with the values of the different digits in the measurement, means for activating a plurality of channels in accordance with the period of time between a pair of adjacent pulses, means for producing in each channel a number of signals dependent upon the activation period of the channel, means for separating the signals representing each condition from the other signals, means for counting and storing the signals in each channel, a gate circuit, means for activating the gate circuit upon the completion of the count of the signals in the different channels, and means for sequentially releasing the information stored in the different channels upon the activation of the gate circuit.

2. In combination with apparatus for measuring a plurality of conditions and for converting each measurement into a plurality of pulses spaced in accordance with the values of the different digits in the measurement, means for converting the spacing between each pair of adjacent pulses into a number of signals proportional to the pulse spacings, means for passing the signals representing each digit into a separate channel, means operative by the first pulse in each measurement to count and store the information representing each digit in the measurement, and means operative by the last pulse in the last measurement to print sequentially the digital information stored in the different channels.

3. In combination with apparatus for measuring a plurality of conditions and for converting each measurement into a plurality of pulses spaced in accordance with the values of the different digits in the measurement, means for pairing adjacent pulses in each measurement, means for producing during each pair of adjacent pulses a number of oscillatory signals dependent upon the time interval between the pulses, means for passing the signals representing a particular digit in each measurement into a different one of a plurality of channels corresponding to the number of digits in a measurement, means for further introducing each plurality of signals passing through each of the first mentioned channels into a different one of a plurality of channels corresponding to the sum of the number of digits in all of the measurements, means for storing the information in the different channels, means for sequentially releasing the information stored in the different channels upon the passage of the information into the different channels for storage, and means for printing the information upon its release from each channel.

4. In combination with apparatus for measuring a plurality of conditions and for converting each measurement into a plurality of pulses spaced in accordance with the values of the different digits in the measurement, means for producing signals at predetermined intervals during the period between each pair of adjacent pulses, means for passing the signals between each pair of adjacent pulses into different channels grouped in accordance with the different measurements, means operative after the channelization of the signals to prevent the further introduction of signals to the channeling means, a gate circuit, means operative after the channelization of the signals to activate the gate circuit, means for sequentially activating the different channels upon the activation of the gate circuit to provide for the release of the information represented by the signals in each channel, means for printing the stored information as it is released, and means operative after the printing of the information to return the channeling means to a state of preparedness for the introduction of further signals.

5. In combination with apparatus for measuring a plurality of conditions and for converting each measurement into a plurality of pulses spaced in accordance with the values of the different digits in the measurement, means for converting the spacing between each pair of adjacent pulses into a number of signals proportional to the spacing, means for channeling the signals representing each measurement and each digit in the measurement, means operative by the first pulse in each measurement to count and store the signals representing the different digits in the measurement, means operative by the last pulse in each measurement to prevent any further information from being introduced to the counting means, gate means operative by the last pulse in the different measurements upon the storage of all of the signals in the different measurements to release the stored information sequentially, and means operative upon the release of the stored information to print in sequence the information relating to each measurement.

6. In combination with apparatus for measuring a plurality of conditions and for converting each measurement into a plurality of pulses spaced in accordance with the values of the different digits in the measurement, means operative by a first pulse in each measurement for activating a predetermined group of channels, means operative by subsequent pulses in each measurement for producing between each pair of adjacent pulses a number of signals proportional to the spacing between the pulses, means for counting and storing the signals passing through each channel, means operative by the last pulse in each measurement for preventing the introduction of further signals to the group of channels, and means operative by the last pulse in the last measurement for printing in sequence the information in each channel and for preparing the channels for the introduction of subsequent signals.

7. In combination with apparatus for measuring a plurality of conditions and for converting each measurement into a plurality of pulses spaced in accordance with the values of the different digits in the measurement, means for passing the signals representing a particular digit in each measurement into a different one of a plurality of channels corresponding to the number of digits in a measurement, means for further introducing each plurality of the signals passing through each of the first mentioned channels into a different one of channels corresponding to the sum of the number of digits in all of the measurements, means for counting and storing the information in the different channels, means operative upon the storage of the signals in the last measurement to pass through the first mentioned channels signals representing a measurement correlating the other measurements, means for counting and storing in separate channels the information relating to the different digits in the correlating measurement, and means operative after the count of the correlating measurement to print in sequence the information stored in the different channels.

8. In combination with apparatus for measuring a plurality of conditions and for converting each measurement into a plurality of pulses spaced in accordance with the values of the different digits in the measurement, means for converting the time period between each pair of successive pulses in a measurement into a plurality of signals proportional to the period, means for passing the signals representing a particular digit in each measurement into a different one of a plurality of channels corresponding to the number of digits in a measurement, means for further introducing each plurality of the signals passing through each of the first mentioned channels to a different one of a plurality of channels corresponding to the sum of the number of digits in the measurements, means for counting and storing the signals in each of the channels, means operative upon the introduction of signals to each group of channels to prevent the further introduction of signals to the channels, means operative upon the count of signals in the last measurement to pass through the first mentioned channels signals representing a measurement correlating the other measurements, means for counting and storing in separate channels the information relating to the different digits in the correlating measurement, means operative after the count of the correlating measurement to print in sequence the information stored in the different channels, and means operative after the printing of all the information to unblock the channels for the introduction of further signals.

9. In combination at a central station, means for receiving sequences of pulses from a position removed from the central station, each sequence of pulses being indicative of a different condition, means for deriving measurements relating to other conditions from the received sequences of pulses, means for converting each derived measurement into a sequence of pulses similar to the received sequences of pulses, means for converting the period of time between each pair of successive pulses in a sequence into a plurality of signals indicative of the time period, means for successively introducing each of the pulse sequences into the conversion means, means for introducing into a separate channel the output signals produced by the conversion means between each pair of pulses in a sequence, means for counting and storing the signals in each channel, means for providing a written record of the information in each counter, and means for sequentially activating each storage means upon the reception of pulse sequences representing the different conditions to provide for the passage of the information in the storage means to the recording means.

10. In combination at a central station, means for receiving sequences of pulses from a position removed from the central station, each sequence of pulses being indicative of a different condition, means for converting the time periods between the different pairs of successive pulses in a sequence into pluralities of signals indicative of the value of the condition represented by the sequence, means for storing in separate channels the pluralities of signals produced between each pair of successive pulses, means at the central station for operating on the sequence of pulses to derive the values of other conditions, means for converting each of the derived measurements into a sequence of pulses indicative of the measurement, means for introducing each of the derived pulse sequences into the conversion means to produce pluralities of signals indicative of the spacing between successive pairs of pulses, means for storing in separate channels the pluralities of signals produced between each pair of successive pulses in a derived sequence, means for releasing in sequence the information stored in the different channels upon the reception of pulse sequences representing the different conditions, and means for providing a printed record of the released information.

11. In combination at a central station, means for receiving at the central station sequences of pulses representative of different conditions at a distant position, means for deriving from the received sequences of pulses information relating to other conditions at the distant position, means operative during the period between each pair of successive pulses in a sequence to produce a plurality of signals proportional to the period, means operative by the first pulse in each received sequence to direct into predetermined channels the pluralities of signals produced between each pair of pulses in the sequence, means operative upon the passage of the received information into their predetermined channels to convert the derived information into sequences of pulses similar to the received sequences, means for successively directing the derived sequences of pulses into the means for producing pluralities of signals, means for directing into predetermined channels the pluralities of signals representative of the derived pulse sequences, means for sequentially releasing the information stored in the different channels upon the reception of pulse sequences representing the different conditions, and means for providing a written record of the channeled information as it is released.

12. In combination at a central station, means for receiving sequences of pulses from a position removed from the central station, each sequence of pulses being indicative of a different condition, means for converting the time period between each pair of successive pulses in a sequence into a plurality of signals proportional to the time period, means operative by the first pulse in each sequence to direct each plurality of signals from the conversion means into a separate channel, means for counting and storing the plurality of signals in each channel, means for deriving from the received pulses information relating to other conditions at the removed position, means for converting the derived information into sequences of pulses similar to the received pulses, means operative upon the channeling and storing of the received information to convert the derived sequences of pulses into pluralities of signals proportional to the time periods between the pulses, means for channeling the pluralities of signals relating to the derived conditions, means for counting and storing the pluralities of signals in each of the last mentioned channels, a normally closed gate circuit associated with each storage means, a typing circuit for providing a written record of the information in each storage means, and means for sequentially opening each gate circuit for the passage of information from the associated storage means to the typing circuit upon the reception of pulse sequences representing the different conditions.

13. In combination with apparatus for measuring a plurality of conditions and for converting each measurement into a plurality of pulses spaced in accordance with the values of the different digits in the measurement, apparatus for passing the information relating to each digit into separate channels, including, means for producing between each pair of adjacent pulses a number of oscillatory signals dependent upon the spacing between the pulses, a plurality of gate circuits, means for introducing the oscillatory signals to the gate circuits, means connected to the gate circuits for normally preventing the passage of the oscillatory signals, and means triggered by the first pulse in a particular measurement to unblock the gate circuits for the passage of the oscillatory signals into their respective channels, the gate-blocking means being triggered by the last pulse in the measurement to prevent the further introduction of oscillatory signals into the channels.

14. In combination with apparatus for measuring a plurality of conditions and for converting each measurement into a plurality of pulses spaced in accordance with the values of the different digits in the measurement, apparatus for grouping the information relating to each measurement and passing the information relating to each digit in each measurement into separate channels, including, means for converting the spacing between each pair of adjacent pulses into a number of signals dependent upon the spacing, a plurality of normally blocked gate circuits grouped to receive the signals representing the different measurements, a first multivibrator associated with each group of gate circuits and triggered by the first pulse in a particular measurement, and a second multivibrator associated with each group of gate circuits and triggered by the first multivibrator to unblock the gate circuits, the second multivibrator in each group also being triggered by the last pulse in the particular measurement to block the gate circuits in the group until the release of the information in the gate circuits.

15. In combination with apparatus for measuring a plurality of conditions and for converting each measurement into a plurality of pulses spaced in accordance with the values of the different digits in the measurement, apparatus for grouping the information relating to each measurement and passing the information relating to each digit in each measurement into separate channels, including, means for converting the spacing between each pair of adjacent pulses into a number of signals dependent upon the spacing, a plurality of normally blocked gate circuits grouped to receive the signals representing the different measurements, a first multivibrator associated with each group of gate circuits and adapted to be triggered by the first information pulse in a predetermined measurement, a second multivibrator associated with each group of gate circuits and adapted to be triggered by its associated first multivibrator upon the reception of the first information pulse in the measurement, the second multivibrator being adapted upon being triggered to open its associated gate circuits for the passage of the information signals, means for returning the second multivibrator in each group to its original condition upon the introduction of the last pulse in the particular measurement, and means for returning the first multivibrators to their original condition after the printing of the information relating to the different measurements.

16. In combination with apparatus for measuring a plurality of conditions and for converting each measurement into a plurality of pulses spaced in accordance with the values of the different digits in the measurement, means operative by the first pulse in each sequence to form a sequence of control pulses, each control pulse being activated for a period of time coincident with the second pulse in a sequence relating to a different one of the plurality of conditions, a plurality of gate circuits, each gate circuit being opened by a different control pulse for the passage of the second pulse in a particular sequence, means operative by the second pulse in each sequence to form during the period of time between each pair of successive pulses in the sequence a plurality of signals indicative of the period, a plurality of storage circuits associated with each gate circuit and operative by the pulse from the gate circuit to receive the pluralities of signals formed during the pulse sequence following the gating pulse, and means for recording the information represented by each plurality of signals after the passage into the storage means of the signals representing the different conditions.

17. In combination with apparatus for measuring a plurality of conditions and for converting each measurement into a plurality of pulses spaced in accordance with the values of the different digits in the measurement, means operative by the first pulse in each sequence to form a first control pulse for a predetermined period of time embracing the first and second pulses in a sequence relating to a particular condition, first gate means opened by the control pulse for the passage of the second pulse in the particular sequence, channel means activated by the pulse from the gate means, means operative by the pulse from the gate means to convert the time period between each pair of adjacent pulses in the particular sequence into a plurality of signals indicative of the time period and to pass each plurality of signals into a different one of the channel means, means operative at the end of the first control pulse to form a second control pulse for a predetermined period of time embracing the second pulse in a sequence relating to a different condition, second gate means opened by the second control pulse for the passage of the second pulse in the particular sequence, channel means activated by the pulse from the second gate means, the conversion means being operative by the pulse from the second gate means to form during the period of time between each pair of adjacent pulses a plurality of signals indicative of the time period between the pulses and to pass each plurality of signals into a different one of the last mentioned channel means, and means operative upon the passage of the pluralities of signals into their associated channel means to record in sequence the information represented by each plurality of signals.

18. In combination with apparatus for measuring a plurality of conditions and for converting each measurement into a plurality of pulses spaced in accordance with the values of the different digits in the measurement, means for producing a plurality of signals at predetermined intervals during the period between each pair of adjacent pulses, means for passing the signals between each pair of adjacent pulses into different channels grouped in accordance with the different measurements, means for counting the signals passing into each channel, a gate circuit operative to produce a control signal upon the introduction of the digital information to each channel, a plurality of gate circuits each associated with a different channel, indicating means, and means for opening each of the gate circuits in sequence upon the production of the control signal to provide for the passage of information from the counting means to the indicating means.

19. In combination with apparatus for measuring a plurality of conditions and for converting each measurement into a plurality of pulses spaced in accordance with the values of the different digits in the measurement, means operative by a first pulse in each measurement for activating a predetermined group of channels, means operative by subsequent pulses in each measurement for producing between each pair of adjacent pulses a number of signals proportional to the spacing between the pulses, means for directing each plurality of signals into a different one of the activated channels, means for counting and storing the signals passing through each channel, indicating means, means for preparing the indicating means for the reception of information at a predetermined rate, means for preventing the preparing means from operating until the introduction of the digital information to all of the channels, and means for activating the channels in sequence upon successive preparations of the indicating means so as to provide for the sequential passage of information from the counting means.

20. In combination with apparatus for measuring a plurality of conditions and for converting each measurement into a plurality of pulses spaced in accordance with the values of the different digits in the measurement, means for producing a plurality of signals at predetermined intervals during the period between each pair of adjacent pulses, means for passing the signals between each pair of adjacent pulses into different channels grouped in accordance with the different measurements, means for counting the signals passing into each channel, a gate circuit operative to produce a control signal upon the passage of a plurality of signals through each of the channels, a plurality of multivibrators each associated with a different channel to provide when actuated for the passage of the information from the associated counting means, means for actuating the multivibrators in sequence upon the production of the control signal, and means for providing an indication of the information passing from the counting means.

21. In combination with apparatus for measuring a plurality of conditions and for converting each measurement into a plurality of pulses spaced in accordance with the values of the different digits in the measurement, means for producing a plurality of signals at predetermined intervals during the period between each pair of adjacent pulses, means for passing the signals between each pair of adjacent pulses into different channels grouped in accordance with the different measurements, means for counting the signals passing into each channel, means for indicating the count in each channel, a switch connected to the indicating means to control the passage of information from the counting means to the indicating means, means for closing the switch at periodic intervals upon the passage of information to the different counting means, and means for providing for the introduction of information in sequence from the different counting means to the indicating means upon successive closures of the switch.

22. In combination with apparatus for measuring a plurality of conditions and for converting each measurement into a plurality of pulses spaced in accordance with the values of the different digits in the measurement, means for producing a plurality of signals at predetermined intervals during the period between each pair of adjacent pulses, means for passing the signals between each pair of adjacent pulses into different channels grouped in accordance with the different measurements, means for counting the signals passing into each channel, means for indicating the count of signals in each channel, a plurality of gate circuits each associated with a different channel, means for opening each of the gate circuits in sequence for the passage of information from the associated counting means upon the passage of information to the different counting means, and a switch connected to the gate circuits and the indicating means and adapted to be closed upon each opening of the gate circuits to provide for the passage of information from the gate circuits to the indicating means.

References Cited in the file of this patent

UNITED STATES PATENTS

| | | |
|---|---|---|
| 2,405,597 | Miller | Aug. 13, 1946 |
| 2,420,509 | Whittaker | May 13, 1947 |
| 2,443,198 | Sallach | June 15, 1948 |
| 2,457,819 | Hoeppner | Jan. 4, 1949 |
| 2,468,703 | Hammel | Apr. 26, 1949 |
| 2,537,056 | Hoeppner | Jan. 9, 1951 |
| 2,680,240 | Greenfield | June 1, 1954 |